(12) United States Patent
Cardozo et al.

(10) Patent No.: US 7,760,665 B2
(45) Date of Patent: Jul. 20, 2010

(54) SELECTIVE NODE TRACKING

(75) Inventors: Ruben Salazar Cardozo, Alpharetta, GA (US); Rahman Abderrahman, Duluth, GA (US); Brian Seal, Powell, TN (US); John Bettendorff, San Francisco, CA (US)

(73) Assignee: Cellnet Technology, Inc., Alpharetta, GA (US)

( * ) Notice: Subject to any disclaimer, the term of this patent is extended or adjusted under 35 U.S.C. 154(b) by 147 days.

(21) Appl. No.: 12/040,404

(22) Filed: Feb. 29, 2008

(65) Prior Publication Data

US 2009/0219941 A1 Sep. 3, 2009

(51) Int. Cl.
*H04L 12/28* (2006.01)

(52) U.S. Cl. .............. 370/254; 370/252; 707/100; 709/223; 709/224; 709/230; 709/240

(58) Field of Classification Search ............. None
See application file for complete search history.

(56) References Cited

U.S. PATENT DOCUMENTS

| 7,577,108 | B2 * | 8/2009 | Zhang et al. | 370/255 |
| 2008/0165692 | A1 * | 7/2008 | Strutt et al. | 370/236 |

* cited by examiner

*Primary Examiner*—Ayaz R Sheikh
*Assistant Examiner*—Nicholas Sloms
(74) *Attorney, Agent, or Firm*—Fish & Richardson P.C.

(57) ABSTRACT

A list of nodes is segmented into one or more segments, each segment having a node limit and a segment criteria, attributes associated with a first node are identified, a determination is made whether to add the first node to a particular segment of the node list based on the node limit and the attributes of the first node, nodes are ranked nodes in the particular segment, and a determination is made whether to remove a candidate node from the particular segment based on the node limit.

24 Claims, 6 Drawing Sheets

300

| Node List | | |
|---|---|---|
| Tracked nodes Device ID | Default Rank | Geographic Identifier (Latitude:Longitude) |
| 0010 | 4 | 33.65:84.42 |
| 0011 | 4 | 33.66:84.80 |
| 0100 | 3 | 33.88:84.30 |
| 0101 | 3 | 33.89:84.28 |
| 0110 | 2 | Unknown |
| 0111 | 0 | 33.63:84.90 |
| 1000 | 1 | 33.75:84.30 |
| 1001 | 1 | 33.82:84.34 |
| 1010 | 1 | 33.90:84.77 |
| 1011 | 0 | 33.60:84.80 |
| 1100 | 1 | 33.89:84.28 |

SELECTIVE NODE TRACKING

BACKGROUND

The subject matter of this document relates to the field of data communications.

Communications networks are continually changing in structure and routing methods in order to facilitate widespread network availability. A mesh network is a network that utilizes the communications nodes within the network as data repeaters to extend the range of a wireless network. By utilizing the nodes as data repeaters, nodes that otherwise would not be in range of the wireless access point are able to utilize the network resources by connecting through a chain of nodes that connect to the wireless access point. Mesh networks reduce the amount of infrastructure that is typically required to extend network resources and increase the flexibility of the individual users because they can connect to the network from more locations.

Mesh networks present challenges because they are ever changing networks. The nodes in a wireless mesh network can move or drop out of the network altogether. Additionally, since nodes may be added at any time it is more difficult to maintain an accurate listing of the nodes that are connected to the network. Therefore, many of the traditional network routing strategies are less effective in a mesh network environment.

SUMMARY

The subject matter of this document relates to selective node tracking. Nodes in a mesh network maintain a node list that identifies other nodes that a particular node can communicate with by tracking these other nodes. The node list can selectively track nodes based on attributes associated with the nodes. The node list can selectively track a single group of nodes or the node list can be segmented so that it can track groups of nodes based on different attributes.

In general, one aspect of the subject matter described in this document can be embodied in methods that include the actions of segmenting a node list into segments, each segment having a node limit and a segment criteria; identifying attributes associated with a first node; determining whether to add the first node to a particular segment of the node list based on the node limit and the attributes of the first node that satisfy the segment criteria; ranking the nodes in the particular segment; determining whether to remove a candidate node from the particular segment based on the node limit. Other embodiments of this aspect include corresponding systems, apparatus, and computer program products.

These and other embodiments can optionally include one or more of the following features. The nodes can be ranked in the particular segment based on the attribute that satisfies the segment criteria of the segment. The attributes can be radio characteristics and geographic identifiers. The node list can be segmented by reserving a defined number of positions in the node list for nodes having attributes that satisfy the segment criteria.

Optional actions can be performed, including ranking the segments based on the segment criteria and adding the first node to the particular segment. The particular segment can be the segment having the highest ranking.

Additional optional actions can be performed including identifying a message packet for routing to a destination, selecting a preferred node from the node list, and routing the packet to the preferred node. The preferred node can be determined based on routing information.

Other embodiments of this aspect include corresponding systems, apparatus, and computer program products.

One or more of the following advantages may be achieved. One advantage realized is more effectively use limited node tracking capacity to track higher quality nodes. Another advantage realized is greater availability of nodes having different desirable attributes by reserving different segments of a node list for nodes based on the different desirable attributes. Still another advantage realized is more efficient node routing by maintaining a node list with nodes having different desirable attributes.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is an illustration of an example node list including two segments.

Like reference numbers and designations in the various drawings indicate like elements.

DETAILED DESCRIPTION

Figure 1:
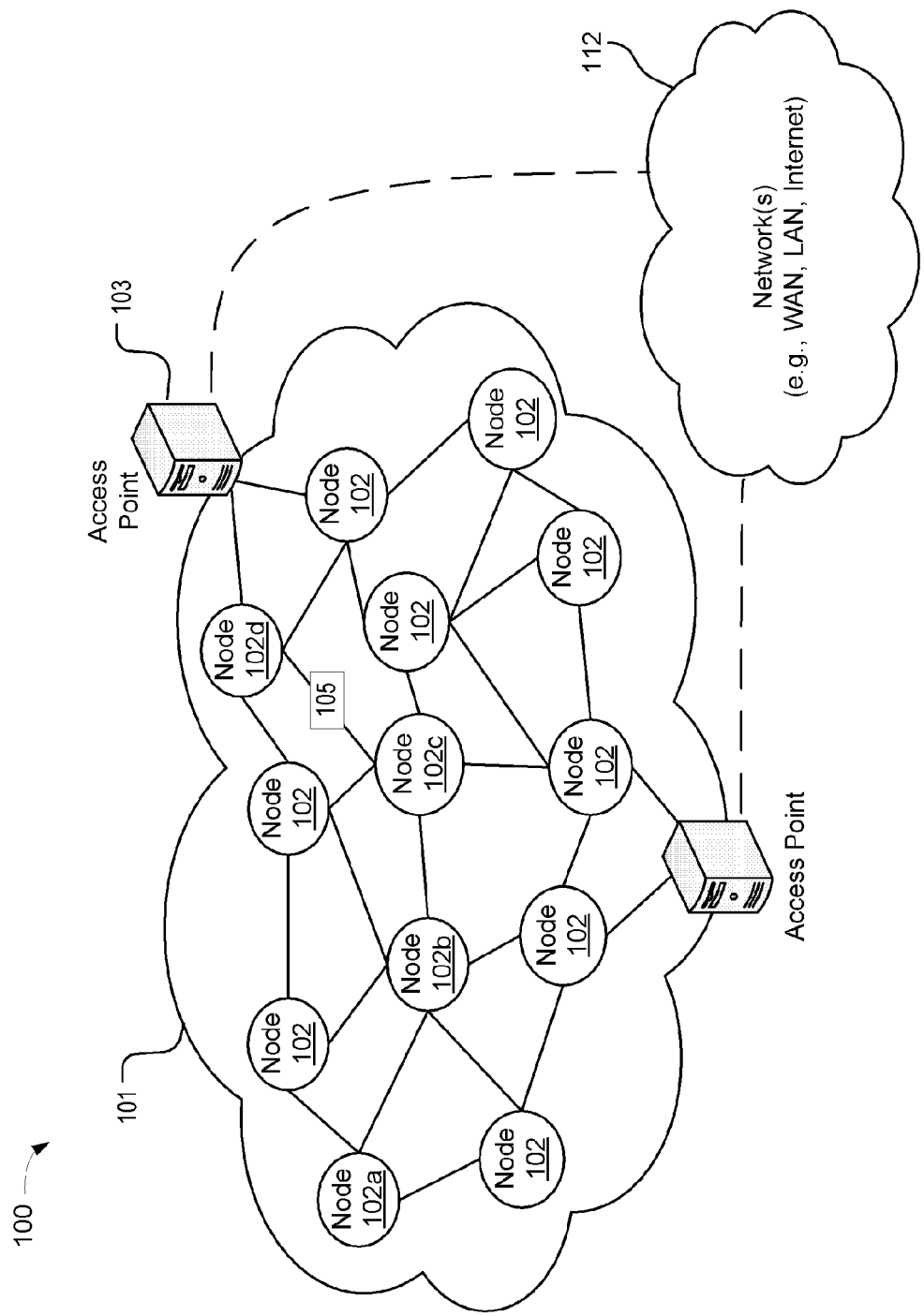
FIG. 1 is a block diagram illustrating an environment in which node culling can be performed.

FIG. 1 is a block diagram illustrating an environment 100 in which selective node tracking can be performed. In some implementations, a mesh network 101 can be implemented in the environment 100. Within the mesh network 101, nodes 102 can be used to transmit packets throughout the mesh network 101. For example, if a packet originates in node 102a and is destined for node 102d, it may be transmitted through nodes 102b and 102c before being received at node 102d. The mesh network 101 can be connected to one or more other networks 112 by access points 103 to facilitate communication with the other networks 112 that are external to the mesh network 101.

Each node 102 in the mesh network 101 can be capable of identifying other nodes that a node 102 can communicate with to facilitate transmission of a packet through the network. A node 102 can identify other nodes, for example, by receiving packets 105 from other nodes that are within communication range of the node 102. The packets 105 can contain node attributes associated with the nodes that transmitted the packets 105. In some implementations, the node attributes can be radio characteristics and geographic identifiers.

For example, radio characteristics can include a node identifier, node type, a default rank, communications range, and any other information that characterizes the node. The node identifier can be, for example, the name or internet protocol address of the node or any other identifier that distinguishes a particular node from other nodes.

The node type can be an indication of the quality of the node radio, which may correlate to whether the node is identified as a residential node, commercial/industrial node, pole top node, or a router. In some implementations, residential nodes can have the lowest quality node radios, commercial, and industrial nodes can have a mid-quality node radio, and routers can have the highest quality node radios.

Similarly, the default rank can be an indication of the quality of the node radio. For example, a node having a default rank of 0 can be the lowest ranked node, while a node having a rank of 4 can be the highest ranked node in a network. In some implementations, the default rank of a node 102 can be manually adjusted based on the installation environment. For example, if a node 102 is the only node installed on a mountain, the default rank of that node can be increased to account for the fact that this node 102 is more important than its original default rank suggests. Similarly, a node that has a high initial default rank can be manually lowered based on the installation environment. For example, if a node 102 is installed in a location that has high interference such that the performance of the node 102 is affected, the default rank can be lowered to account for the actual performance of the node 102 as installed.

The communications range can identify the distance that the node 102 can transmit. Example radio characteristics are provided for example purposes, other radio characteristics can also be used (e.g., receive signal strength indicator)

The geographic identifiers can identify, for example, the geographic location (e.g., geographic coordinates) of the node 102. Alternatively, the geographic identifiers can identify a coordinates relative to a reference location. Other geographic identifiers can also be used (e.g., street address of installation).

The packets 105 that contain the node attributes can be status packets, message packets or any other packets exchanged between the nodes 102. In some implementations, the status packets can be synchronization (SYNC) packets or maintenance packets. SYNC packets can be, for example, random searching packets that are received from other nodes to facilitate identification and communications coordination with the node 102.

Maintenance packets can be, for example, packets that provide updated information about the node that transmitted the packet to the receiving node. For example, if a node attribute for a node 102 has changed, a maintenance packet can be sent that updates the attribute information for receiving nodes.

Each node 102 maintains a node list that contains attributes of other nodes that the node 102 has identified. Maintaining a node list of the other nodes is also referred to as tracking the other nodes. Nodes 102 that are tracked in the node list (i.e., included in the node list) are referred to as tracked nodes. Each node list will have a node limit (e.g., maximum number of nodes) associated with it. Accordingly, once a node list has been filled with tracked nodes, no other nodes 102 can be tracked without removing one of the tracked nodes from the node list.

In some situations, the node list may be filled with tracked nodes that have lower performing attributes than other available nodes. This situation can occur, for example, when the node 102 is first powered on, or installed. The node 102 generally fills the node list with the first available nodes that are identified. Accordingly, the identified nodes that are tracked will generally correspond to the first packets 105 that were received by the node 102. However, available nodes that perform better than the tracked nodes may not have been identified, for example, because packets 105 were not received from these better performing available nodes before the node limit was satisfied. Therefore, selectively removing a node from the node list (e.g., node culling) can facilitate filling the node list with a higher quality group of tracked nodes.

Node culling can be performed, for example, by removing the lowest performing tracked nodes in the node list. The lowest performing tracked nodes can be identified, for example, by ranking the nodes based on the node attributes associated with each of the tracked nodes. In some implementations, the node culling can be performed to maintain a list of tracked nodes that is bounded by a node limit. The node culling can be performed, for example, by a node tracking system 200, as discussed below.

Figure 2:
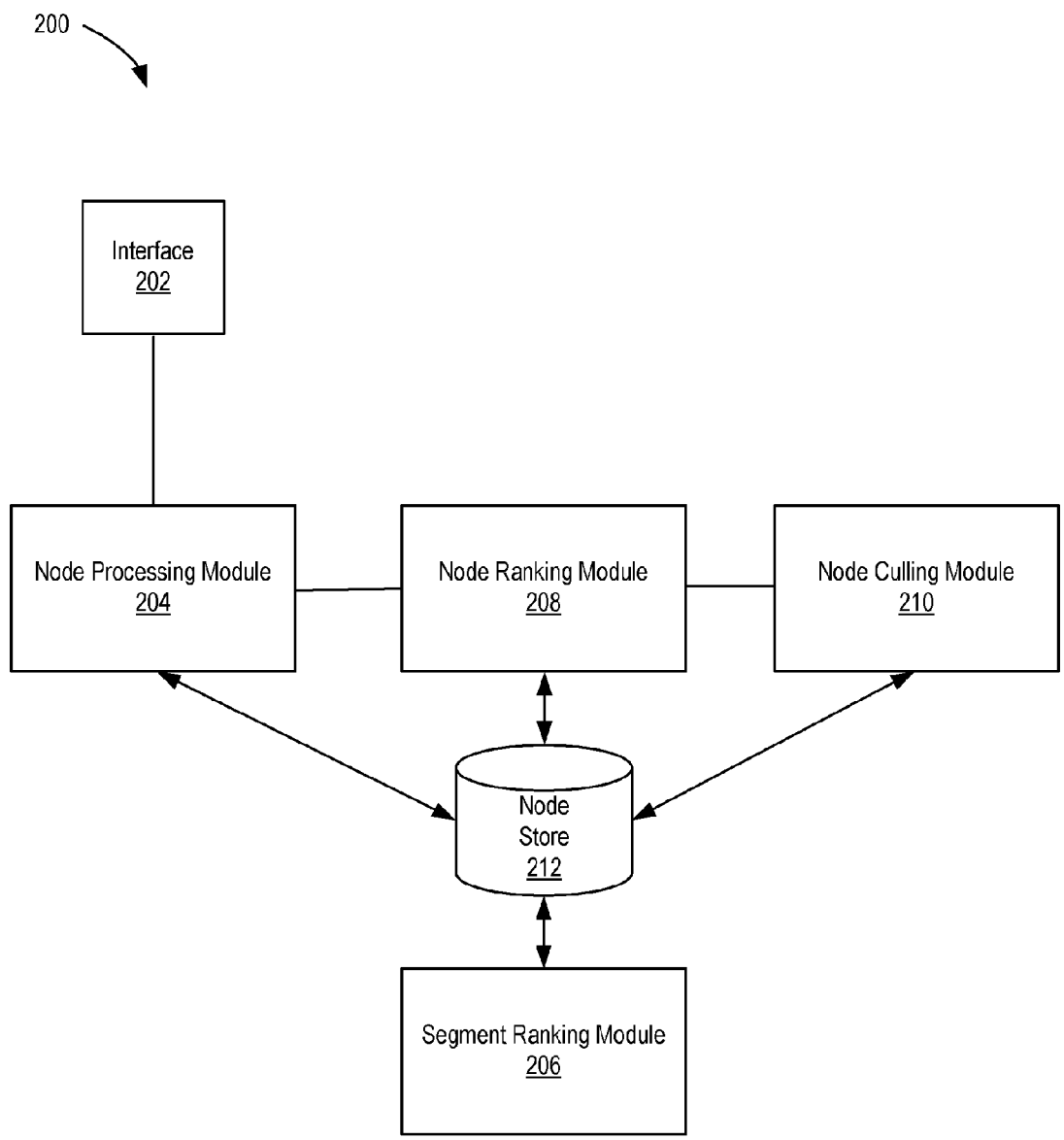
FIG. 2 is a block diagram illustrating an example node tracking system.

FIG. 2 is a block diagram illustrating an example node tracking system 200. In some implementations, the node tracking system 200 can include an interface 202, a node processing module 204, a segment ranking module 206, a node ranking module 208, a node culling module 210, and a node store 212. The node tracking system 200 can be implemented, for example, in nodes 102 in the mesh network 101 of FIG. 1.

The interface 202 receives communications, for example, from a node in the mesh network. The communications can be, for example, packets (e.g., message or status packets, or packets identifying a message or the status of the node). The interface can be, for example, a data bus, a communications interface (e.g., RS-232, Ethernet, wireless or optical data link). The interface 202 passes the communications to the node processing module 204.

The node processing module 204 receives the communications from the interface 202 and identifies attributes associated with the node that sent the communications. The attributes can be identified, for example, by extracting the node attributes from received packets. The node attributes can be node radio characteristics and/or geographic identifiers. The radio characteristics can be, for example, a node identifier, the available resources of the node radio, node radio range, node radio communications timing information, node radio type and/or default rank of the node. The geographic identifier can represent information identifying the location of the radio, for example, geographic coordinates or the installation street address.

The node processing module 204 can also determine whether the identified node should be added to and tracked by the node list. The node processing module 204 can determine whether the node should be added to the node list based, at least in part, based on the status of the node list. The status of the node list can be determined based on the number of tracked nodes that are in the node list and a node limit (e.g., maximum number of nodes).

For example, the node list can have a node limit, for example, of 100 nodes, indicating that the maximum number of tracked nodes that can in the node list at any given time is 100. In turn, if the node processing module 204 determines that there are 100 tracked nodes in the node list, then node processing module 204 can ignore the newly identified node. In contrast, if the node processing module 204 determines that there are less than 100 nodes being tracked, it can add the identified node to the node list.

In some implementations, the node list can be segmented. Each of the node list segments can have segment criteria and a node limit (e.g., maximum number of nodes). The segment criteria can determine the attributes that a node must have to be a tracked node in the particular segment. For example, the segment criteria can require that an identified node be a closest neighbor of the node (e.g., have a geographic identifier within a defined range) to become a tracked node. Similarly, the segment criteria for another segment can require, for example, that an identified node have a minimum default rank associated with it to become a tracked node in that segment. When the node processing module 204 determines that an identified node has attributes that satisfy a segment of the node list the node processing module 204 can add the node to the segment according to the node limit of the segment.

The node limit can be used within the segments of the node list in the same manner as described above for a node list that is not segmented. For example, if the particular segment is tracking a number of other nodes, an additional identified node can be added to the segment. However, if the node limit for a segment has been satisfied, then no additional nodes can be added to the node segment without first removing a tracked node from the segment as discussed below, so that the node limit is not exceeded.

A single identified node can have attributes that satisfy more than one of the segment criteria of different segments. For example, an identified node having a high default rank can also be identified as a closest neighbor based on its geographic identifier. The node processing module 204 can add the identified node to both segments of the node list, but doing so can result in two positions of the node list being occupied by one identified node. Therefore, in some implementations, the segments can be ranked to identify which segment of the node list will be used to track the identified node. In turn, the node processing module 204 can add the identified node, for example, to the highest ranking segment that has segment criteria satisfied by the attributes of the identified node.

In some implementations, a segment ranking module 206 can be used to rank the segments of the node list based on the segment criteria of the segments. For example, the closest neighbors can be determined to be the most important tracked nodes in the node list. In turn, the segment of the node list that has segment criteria that require an identified node to be within a defined geographic area can be defined as the highest ranked segment. Accordingly, when the node processing module 204 identifies a node that satisfies the closest neighbors segment as well as another segment, the node processing module 204 can add the identified node to the closest neighbors segment rather than the other segment. Ranking segments in this manner enables a network manager to identify and prefer particular links in a network.

In some implementations, message packets received in the mesh network can identify the information associated with the packet being transmitted to a destination. For example, routing information can include routing preferences that specify normal delivery, fast delivery, or critical delivery. Additionally, routing information can include the destination of the message packets. Segmenting the node list and ranking segments of the node list can facilitate tracking nodes that can be used for routing packets with different routing preferences.

For example, if a message packet is received that indicates fast delivery, routing can be performed by transmitting the packet as far as possible during each hop through the mesh network. In this situation, segmenting the node list so that a portion of the node list is reserved for nodes having a threshold communications range facilitates the availability of a preferred node (e.g., having high communications range) for routing fast message packets.

Similarly, if a message packet is received that indicates critical delivery, routing can be performed, for example, only by nodes having battery back up. Again, segmenting, the node list so that a portion of the nodes list is reserved for nodes having battery back-up can facilitate the availability of a preferred node (e.g., having battery back-up) for routing critical message packets.

Once an identified node is added to the node list, or a segment of the node list, a node ranking module 208 ranks the tracked nodes in the node list. The ranking module 208 can also rank the tracked nodes within in segments of the nodes list, for example, according to the segment criteria associated with the segment. For example, if the segment defines a minimum default rank for the tracked nodes, the ranking module 208 can use default rank to rank the tracked nodes within the segment.

Secondary criteria can also be used to rank nodes. For example, if two tracked nodes both have a default rank of 2, or if the segment of the node list requires nodes to have, for example, battery back-up, then the ranking module 208 can use, for example, the geographic identifiers to determine which of the tracked nodes is ranked higher than the other tracked node. The ranking module 208 can rank all of the tracked nodes in the node list.

The node culling module 210 can remove a tracked node or nodes to create capacity for a new identified node. This can occur, for example, if the node limit has been met. As discussed, when the node limit has been met, there is no additional capacity in the node list and/or segment to add identified nodes prior to determining whether the identified should be tracked. Accordingly, a tracked node must be removed from the node list prior to adding an identified node. Therefore, a determination of whether the identified node performs better than the tracked nodes, prior to adding the node, can be performed.

For example, when the node processing module 204 identifies a node, the node processing module 204 can extract the attributes associated with the identified node and compare the attributes to the attributes of the tracked nodes in the node list. In turn, if the node processing module 204 determines that the identified node's attributes are better than the attributes of the tracked nodes in the node list, the node culling module 210 can remove the lowest ranked tracked node in the node list. Similarly, if the node list is segmented, the node culling module 210 can remove the lowest ranked node in the particular segment that will track the identified node.

Removing the lowest ranked node from the node list and/or the particular segment of the node list creates capacity for the node processing module 204 to add the identified node to the node list and/or segment. Once the new identified node is added to the node list and/or segment, the node ranking module 208 can rank the tracked nodes so that the identified node is placed in the correct rank among the tracked nodes.

The node list can be maintained in a node store 212. The node store can be any storage device that is capable of storing data (e.g., hard drive, optical drive, solid state memory). The node store 212 can be in communication with the node processing module 204, the node ranking module 208, the segment ranking module 206 and the node culling module 210.

FIG. 3 is an illustration of an example node list 300 including two segments. Each of the segments can have segment criteria that must be satisfied for a node to be tracked in the segment. For example, the first segment 302 includes tracked nodes 303 that have attributes that satisfy a default rank segment criteria 306. The tracked nodes 303 in segment 302 all have a default rank greater than 1. Similarly, the second segment 304 includes tracked nodes 303 that have attributes that satisfy a geographic identifier segment criteria 308 (e.g., closest neighbors).

Within the segments 302, 304 the tracked nodes 303 can be ranked according to the segment criteria that the tracked nodes 303 satisfy. For example, the tracked nodes 303 in the first segment 302 can be ranked according to the default rank 306. Similarly, the tracked nodes 303 in the second segment 304 can be ranked according to the geographic identifiers 308.

In some implementations, the segments 302, 304 can be ranked to reflect the importance of tracked nodes 303 having attributes that satisfy the segment's segment criteria. For example, if the first segment 302 is ranked higher than the second segment 304 then an identified node that satisfies both segments 302, 304 will be added to the first segment 302 since it is ranked higher than the second segment 304. This insures that tracked nodes 303 are tracked according to the tracked node's importance in the mesh network.

Figure 4:
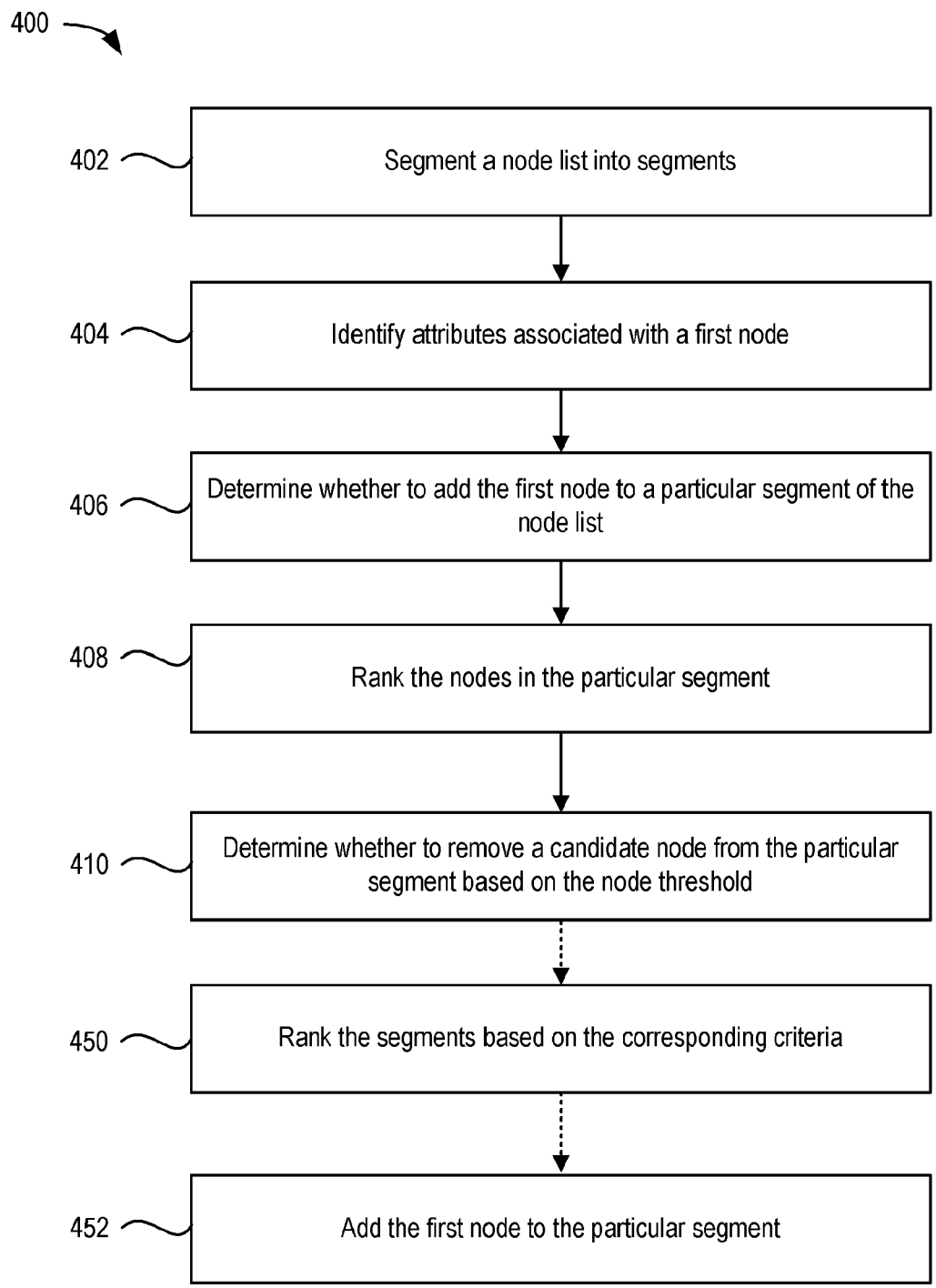
FIG. 4 is a flow chart of an example process of selectively tracking nodes in a mesh network.

FIG. 4 is a flow chart of an example process 400 of selectively tracking nodes in a mesh network. The process 400 can begin by segmenting a node list into segments (402). In some implementations, each segment can have a segment criteria and a node limit. The segment criteria can define the attributes required for nodes that are tracked in the segments. The node limit can be the maximum number of nodes that a segment can track at any given time.

The process 400 can continue by identifying attributes associated with a first node (404). The attributes can be identified, for example, by extracting the attributes from received packets. The attributes can be extracted from status packets or message packets. The attributes can be extracted, for example, by a node processing module 204.

The process 400 can also determine whether to add the first node to a particular segment of the node list (406). The determination can be made based on the node limit. In some implementations, the node can be added to the particular segment if the number of nodes is less than the node limit. In some implementations, the determination to add the node to the particular segment can be based on the attributes of the node. For example, a node having a defined rank can be added to the particular segment without regard to the node limit. In situations where the node limit is satisfied, a tracked node can be removed to create capacity for the node in the node list. The determination of whether to add the first node to a particular segment can be performed, for example, by implementing a node adding determination process in the node processing module 204.

The process 400 can further rank the nodes in the particular segment (408). The nodes can be ranked, for example, according to the attributes that satisfy the segment criteria. Additionally, the nodes can be ranked according to a second criteria that is different from the segment criteria. This secondary criteria can be used, for example, when multiple nodes have the same attributes that satisfy the segment criteria of the particular segment. The nodes can be ranked, for example, by the node ranking module 208.

The process 400 can additionally determine whether to remove a candidate node from the particular segment based on the node limit (410). In some implementations, the candidate node can be a tracked node that is selected for removal. The candidate node can be selected for removal when the node limit is satisfied. For example, if the number of nodes in the particular segment is equal to the node limit, a candidate node can be removed to facilitate addition of an identified node to the node list or segment of the node list. The determination can be performed, for example, by implementing node removal process in the node culling module 210.

The process 400 can also optionally rank the segments based on the segment criteria (450). In some implementations, ranking the segments can be performed according to the relative importance of the segment criteria to the mesh network. For example, if the closest neighbors of a node are the most important links in the mesh network, then the geographical identifier can be the highest ranked segment criteria. The segments can be ranked, for example, by the segment ranking module 206.

The process 400 can also optionally add the first node to the particular segment (452). The particular segment can be the segment having the highest ranking. For example, in the example above where the geographical identifier is the highest ranked segment criteria and both segments are available segments, the segment that has the geographical identifier segment criteria can be the particular segment. In turn, the first node will be added to the particular segment. The first node can be added to the particular segment, for example, by the node processing module 204.

Figure 5:
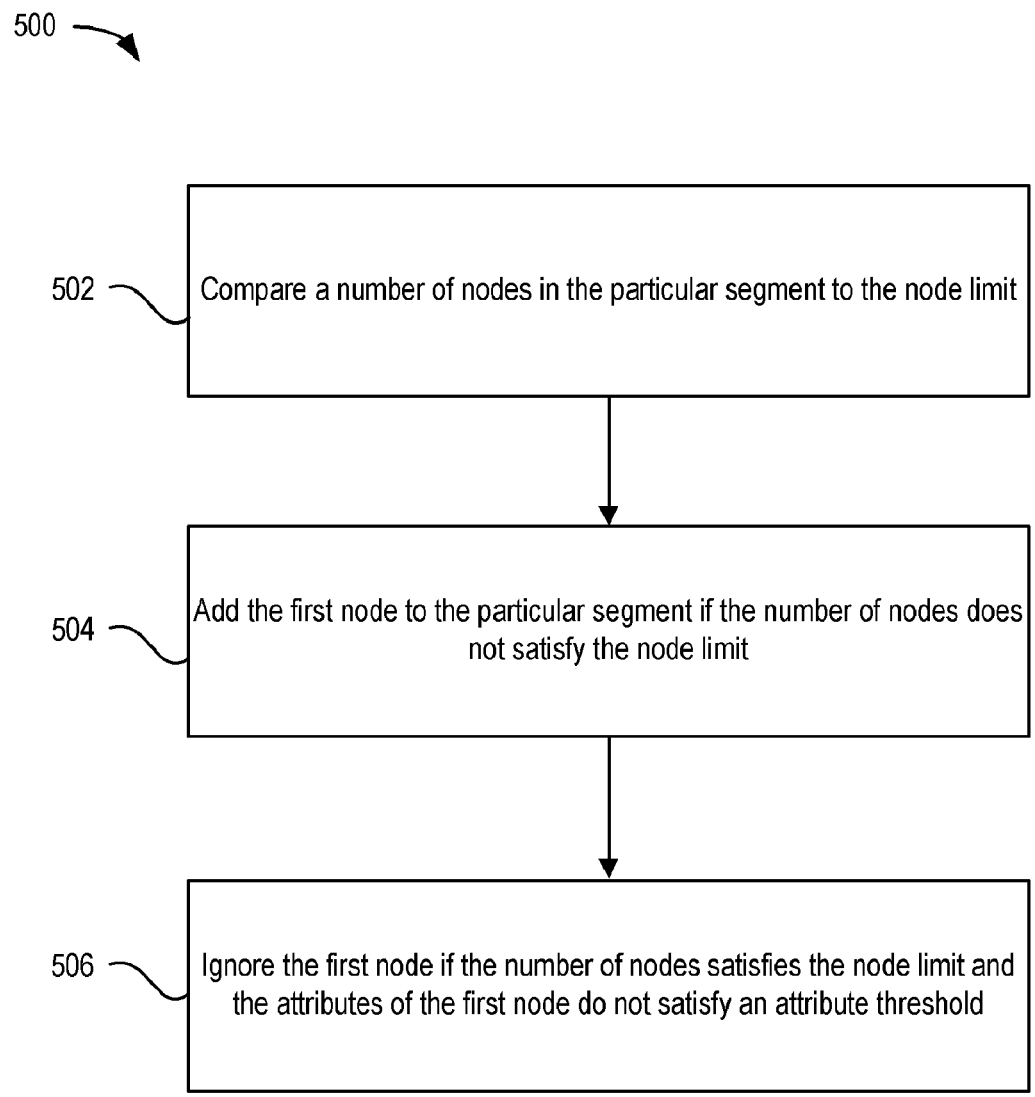
FIG. 5 is flow chart of an example process of determining whether to add a first node to a particular segment

FIG. 5 is a flow chart of an example process 500 of determining whether to add a first node to a particular segment. The process 500 begins by comparing a number of nodes in the particular segment to the node limit (502). The comparison can be performed, for example, by the node processing module 204.

The process 500 adds the first node to the particular segment if the number of nodes does not satisfy the node limit (504). The first node can be added, for example, to the lowest position available in the particular segment. The node can be added to the particular segment, for example, by the node processing module 204.

The process 500 ignores the first node if the number of nodes satisfies the node limit and the attributes of the first node do not satisfy an attribute threshold (506). If the node limit is satisfied then there is no capacity available to add the first node to the particular segment. In this situation, the first node can be ignored if the first node does not have attributes that satisfy a threshold. For example, the threshold can be defined as the attributes of the lowest ranked node in the segment. Accordingly, if the first node does not have attributes that are at least as good as those associated with the lowest ranked node then the first node can be ignored. In contrast, if the attributes of the first node are equal to or greater than the attributes associated with the lowest ranked node in the segment, then a determination whether to remove a node from the particular segment to create capacity to add the first node can be performed using a node removal process, as discussed below. In some implementations, the attributes that define the attribute threshold can be the attributes that satisfy the segment criteria. In some implementations, secondary criteria can be used to define the attribute threshold.

Figure 6:
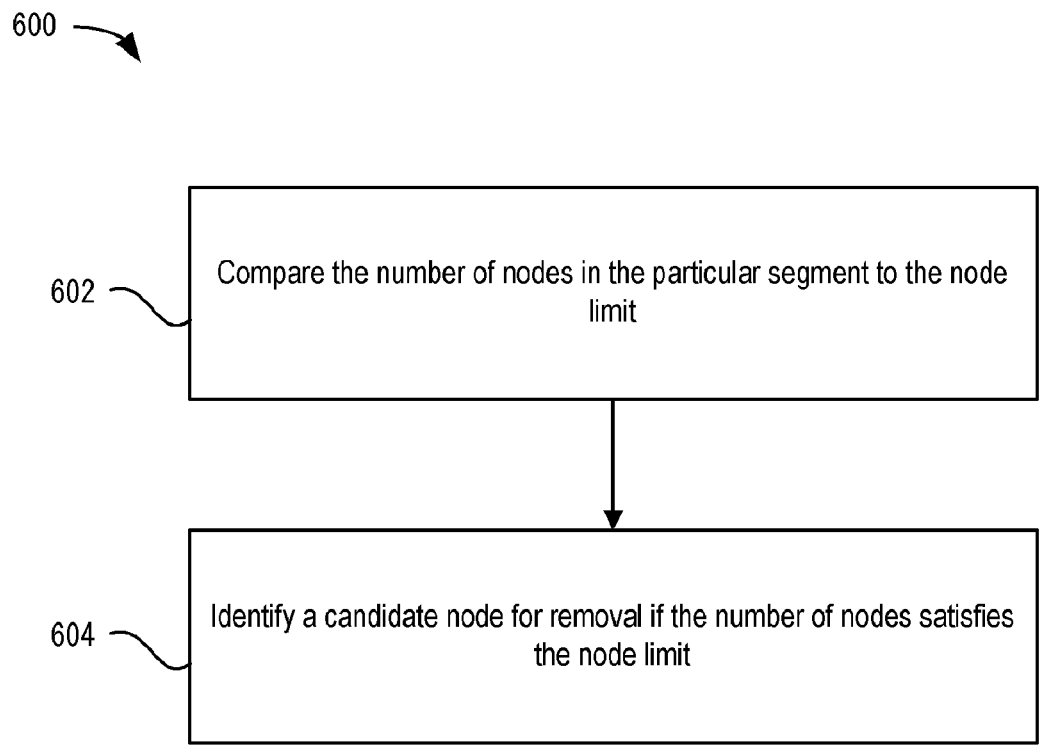
FIG. 6 is a flow chart of an example process of determining whether to remove a candidate node from the particular segment.

FIG. 6 is a flow chart of an example process 600 of determining whether to remove a candidate node from the particular segment. The process 600 begins by comparing the number of nodes in the particular segment to the node limit (602). The comparison can be performed, for example, by the node culling module 210. The node limit can be a fixed number of nodes that are to be included in the particular segment. Alternatively, the node threshold can be dynamically determined based on the nodes that are being tracked in the node list.

For example, if it is determined that tracking more nodes in a particular segment than the original node limit allows will create a better mesh network (e.g., more coverage, higher efficiency or higher reliability), then the node limits for the segments can be adjusted to reallocate the node limits for each segment. This can occur, for example, where high quality tracked nodes having unique geographic placement are part of a particular segment. It can be determined, for example, that the network is stronger having all of tracked nodes that are in the node list and adding the first node, rather than removing some of the tracked nodes to satisfy the node limit. Accordingly, increasing the node limit for this segment can prevent removal of the tracked nodes.

The process 600 continues by identifying a candidate node for removal if the number of nodes satisfies the node limit (604). The candidate node for removal can be the lowest ranked node in the particular segment. For example, if a segment requires that all nodes be either commercial meters or routers and all but one of the nodes in a segment are routers, then the candidate node for removal can be the commercial meter. The identification can be performed, for example, by the node processing module 204.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of selectively tracking communications nodes in a mesh network, comprising:
   segmenting, by a data processing apparatus, a node list into a plurality of segments, each segment having a specified node limit specifying a number of nodes that can be included in the segment, each segment also having a segment criteria specifying a node attribute that each node must have to be included in the segment, wherein the segment criteria for each segment specifies a node attribute that is different from node attributes specified for other segments in the node list;
   identifying, by a data processing apparatus, attributes associated with a first node;
   determining that the attributes associated with the first node satisfy the segment criteria of a particular segment based on a comparison of the attributes associated with the first node and the segment criteria for the particular segment;
   determining, by a data processing apparatus, whether the node limit for the particular segment has been satisfied;

in response to determining that the node limit for the particular segment has not been satisfied adding, by a data processing apparatus, the first node to the particular segment of the node list;

in response to determining that the node limit for the particular segment has been satisfied:
ranking, by a data processing apparatus, the nodes in the particular segment; and
determining, by a data processing apparatus, whether to remove a candidate node from the particular segment based on the node limit.

2. The method of claim 1, wherein determining whether to remove the candidate node from the particular segment based on the node limit comprises:
identifying the candidate node for removal when the number of nodes satisfies the node limit and the first node is ranked higher in the segment than the candidate node, wherein the candidate node is a lowest ranked node in the particular segment.

3. The method of claim 1, wherein ranking the nodes in the particular segment comprises ranking the nodes in the particular segment based on the node attributes that satisfy the segment criteria of the particular segment.

4. The method of claim 1, wherein identifying attributes comprises identifying a radio characteristic and a geographic identifier.

5. The method of claim 4, wherein the radio characteristic comprises at least one characteristic selected from the group of characteristics consisting of a node identifier, default rank, radio type, range, timing, and available resources.

6. The method of claim 4, wherein the geographic identifier comprises geographic coordinates associated with the node.

7. The method of claim 1, further comprising:
ranking the segments based on the segment criteria associated with each segment;
determining that the first node has node attributes that satisfy two or more segments in the node list; and
adding the first node to the particular segment, wherein the particular segment is the segment having the highest ranking among segments having segment criteria that are satisfied by the node attributes associated with the first node.

8. The method of claim 1, wherein receiving communications from the first node comprises receiving communications from at least one of a residential meter, a commercial meter, or a pole top node in an automatic meter reading network.

9. The method of claim 1, wherein segmenting a node list comprises reserving a portion of the node list for nodes having the attributes that satisfy the segment criteria.

10. The method of claim 1, further comprising:
identifying a message packet for routing to a destination;
selecting a preferred node from the node list, wherein the preferred node is determined based on routing information; and
routing the packet to the preferred node.

11. The method of claim 10, wherein the routing information comprises a routing preference and a packet destination.

12. A mesh network node tracking system, comprising:
a receiver to receive communications from a first node;
a node processing module having a corresponding node list that includes a plurality of specified segments, where each specified segment has a specified node limit, the node processing module configured to identify attributes associated with the first node, compare the identified attributes to segment criteria associated with the specified segments of the node list, and determine whether to add the first node to a particular segment based on the comparison and the specified node limit for the particular segment, the segment criteria specifying a node attribute that each node must have to be included in the segment and each specified segment having a segment criterion that is different from segment criteria of other specified segments in the node list;
a node ranking module to rank the nodes in each specified segment of the node list;
a node culling module to identify a candidate node for removal from a specified segment based on the node limit for the particular segment being satisfied and the first node having a ranking that is higher than the candidate node; and
a node store to maintain a list of tracked nodes, wherein tracked nodes are nodes that have been added to the specified segments of the node list, the tracked nodes in each specified segment of the node list having node attributes that satisfy the segment criteria for the specified segment.

13. The system of claim 12, further comprising a segment ranking module to rank the segments based on the segment criteria associated with the segments.

14. The system of claim 12, further comprising a node routing module to select a preferred node based on available nodes and routing information.

15. The system of claim 14, wherein the routing information comprises a routing preference and a packet destination.

16. The system of claim 12, wherein the first node is one of a residential meter, commercial meter, or a pole top node in an automated meter reading network.

17. The system of claim 12, wherein the attributes comprise a radio characteristic and a geographic identifier.

18. The system of claim 17, wherein the radio characteristic comprises at least one characteristic selected from the group of characteristics consisting of a node identifier, default rank, radio type, range, timing, and available resources.

19. The system of claim 17, wherein the geographic identifier comprises geographic coordinates associated with the node.

20. A meter reading system, comprising:
a plurality of nodes in a communications network; and
a node tracking system configured to:
identify attributes associated with a subset of the plurality of nodes;
compare the attributes of the subset to segment criteria associated with specified segments of a node list, each specified segment of the node list having a specified node limit and a corresponding segment criteria that specifies at least one node attribute that each node included in the specified segment must satisfy, the corresponding segment criteria for each specified segment specifying at least one node attribute that is different from node attributes for other segments in the node list; and
determine whether to add the subset to a particular segment based on the node attributes of the subset, the segment criteria for the particular segment, and a node limit for the particular segment;
rank the nodes in each specified segment of the node list, each node being ranked based on the node attribute that satisfies the segment criteria for the specified segment; and
identify a candidate node for removal from a segment based on a node limit for the segment being satisfied, the candidate node being a node that is ranked below the subset.

21. The system of claim 20, wherein the candidate node is a lowest ranked node in the segment of the node list.

22. The system of claim 20, wherein the communications network is an automated meter reading network.

23. The system of claim 20, wherein the communications network is a mesh network.

24. A method, comprising:
- segmenting, by a data processing apparatus, a node list into a plurality of segments, each segment having a specified node limit specifying a number of nodes that can be included in the segment, each segment also having a segment criteria specifying a node attribute that each node must have to be included in the segment, wherein the segment criteria for each segment specifies a node attribute that is different from node attributes specified for other segments in the node list;
- identifying, by a data processing apparatus, attributes associated with a first node;
- determining that the attributes associated with the first node satisfy the segment criteria of a particular segment based on a comparison of the attributes associated with the first node and the segment criteria for the particular segment;
- determining, by a data processing apparatus, that the node limit for the particular segment has been met;
- in response to determining that the node limit for the particular segment has been met:
  - ranking, by a data processing apparatus, the nodes in the particular segment; and
  - removing, by a data processing apparatus, a candidate node from the particular segment based on the ranking of the nodes in the particular segment; and
- adding, by a data processing apparatus, the first node to the particular segment.

* * * * *